United States Patent

Jeong et al.

[11] Patent Number: 5,917,674
[45] Date of Patent: Jun. 29, 1999

[54] APPARATUS FOR LOADING A CASSETTE IN TAPE RECORDER AND METHOD FOR ASSEMBLING THE SAME

[75] Inventors: Yong-chae Jeong; Byung-sam Son; Myoung-sub Jang, all of Suwon; Chung-ung Kim, Seoul, all of Rep. of Korea

[73] Assignee: Samsung Electronics Co., Ltd., Kyungki-Do, Rep. of Korea

[21] Appl. No.: 08/854,098

[22] Filed: May 9, 1997

[30] Foreign Application Priority Data

Jun. 18, 1996 [KR] Rep. of Korea ............... 96-22072

[51] Int. Cl.$^6$ .................. G11B 15/675; G11B 5/008
[52] U.S. Cl. ............................................. 360/96.5
[58] Field of Search ........................ 360/96.5, 96.6, 360/99.02, 99.06; 369/75.2, 77.1, 77.2

[56] References Cited

U.S. PATENT DOCUMENTS 5,706,147 1/1998 Lee .............................. 360/96.5

Primary Examiner—George J. Letscher
Attorney, Agent, or Firm—Sughrue, Mion, Zinn, Macpeak & Seas, PLLC

[57] ABSTRACT

A cassette loading apparatus in a tape recorder includes a deck on opposite side surfaces of which a loading slit and a protrusion are formed. A cassette holder on which a tape cassette is received is provided and has a pair of side surfaces, each of the side surfaces having a guide protrusion which is slidably combined with a corresponding one of the loading slits. A loading shaft arm is provided and includes side arms each rotatably connected to a corresponding one of the opposite side surfaces of the deck and having a first slot with which the guide protrusion of the cassette holder is combined, and a second slot with which the protrusion of the deck is combined, and a beam for connecting the side arms. A driving mechanism is provided for rotating the side arms. Therefore, the total number of components is reduced, and productivity is enhanced because of the simple assembly. A method of assembling the cassette loading apparatus is also provided.

4 Claims, 4 Drawing Sheets

APPARATUS FOR LOADING A CASSETTE IN TAPE RECORDER AND METHOD FOR ASSEMBLING THE SAME

BACKGROUND OF THE INVENTION

The present invention relates to an apparatus for loading a cassette in a tape recorder and a method of assembling the same.

The structure of a conventional cassette loading apparatus for receiving a tape cassette and loading and unloading the cassette on and from a deck in a tape recorder is schematically shown in FIG. 1. As shown in FIG. 1, a cassette holder 1 for receiving a tape cassette (not shown) is movably combined with left and right guide chassis 41 and 42 fixed on a deck (not shown). The cassette holder 1 is constituted by upper and lower members 10 and 20 and side members 21 and 22 and receives the tape cassette.

Also, a pair of side arms 31 and 32 are rotatably combined with the side members 21 and 22 of the cassette holder 1. In this case, the side arms 31 and 32 are connected to each other by a shaft 30 so as to interlock with each other. Thus, the cassette holder 1 with a tape cassette received therein slides along guide grooves 41a, 41b, 42a and 42b formed on the guide chassis 41 and 42 as the side arms 31 and 32 rotate so that the tape cassette is loaded on the deck.

However, the cassette loading apparatus having such a structure must be separately provided with the side arms 31 and 32 combined with the cassette holder 1 and the shaft 30 for connecting the side arms 31 and 32. Therefore, the number of components and man hours for assembly are increased, and the assembly of the guide chassis 41 and 42 and the cassette holder 1 are complicated.

SUMMARY OF THE INVENTION

Accordingly, to solve the above problems, it is an object of the present invention to provide a cassette loading apparatus whose structure is improved to make the assembly easy by reducing the number of components. A method of assembling the cassette loading apparatus is also provided.

To accomplish the above object, there is provided a cassette loading apparatus in a tape recorder, comprising: a deck including a pair of opposite side surfaces each of which has a loading slit and a protrusion; a cassette holder on which a tape cassette is received and having a pair of side surfaces, each of the side surfaces having a guide protrusion which is slidably combined with a corresponding one of the loading slits; a loading shaft arm including side arms each rotatably connected to a corresponding one of the opposite side surfaces of the deck and having a first slot with which the guide protrusion of the cassette holder is combined, and a second slot with which the protrusion of the deck is combined, and a beam for connecting the side arms; and a driving mechanism for rotating the side arms.

To accomplish the above object, there is also provided a method of assembling a cassette loading apparatus, the cassette loading apparatus including: a deck having a pair of opposite side surfaces each of which has a loading slit and a protrusion; a cassette holder having a pair of side surfaces, each of said side surfaces having a guide protrusion which is slidably combined with a corresponding one of the loading slits; a loading shaft arm including side arms each rotatably connected to a corresponding one of the opposite side surfaces of the deck and having a first slot with which the guide protrusion of the cassette holder is to be combined, and a second slot with which the protrusion of the deck is to be combined and which includes vertical and horizontal slotted portions, and a beam for connecting the side arms, said method comprising the steps of: a) sliding and inserting each of the guide protrusions through a corresponding one of the first slots formed on the side arms of the loading shaft arm; b) inserting each of the protrusions of the deck through a corresponding one of the horizontal slotted portions of the second slots by rotating the loading shaft arm; and c) sliding each of the protrusions of the deck from the corresponding horizontal slotted portions to the respective vertical slotted portions by moving the loading shaft arm and combining each of the protrusions with the respective vertical slotted portions.

BRIEF DESCRIPTION OF THE DRAWINGS

The above object and advantages of the present invention will become more apparent by describing in detail a preferred embodiment thereof with reference to the accompanying drawings, in which.

DETAILED DESCRIPTION OF THE INVENTION

Figure 1:
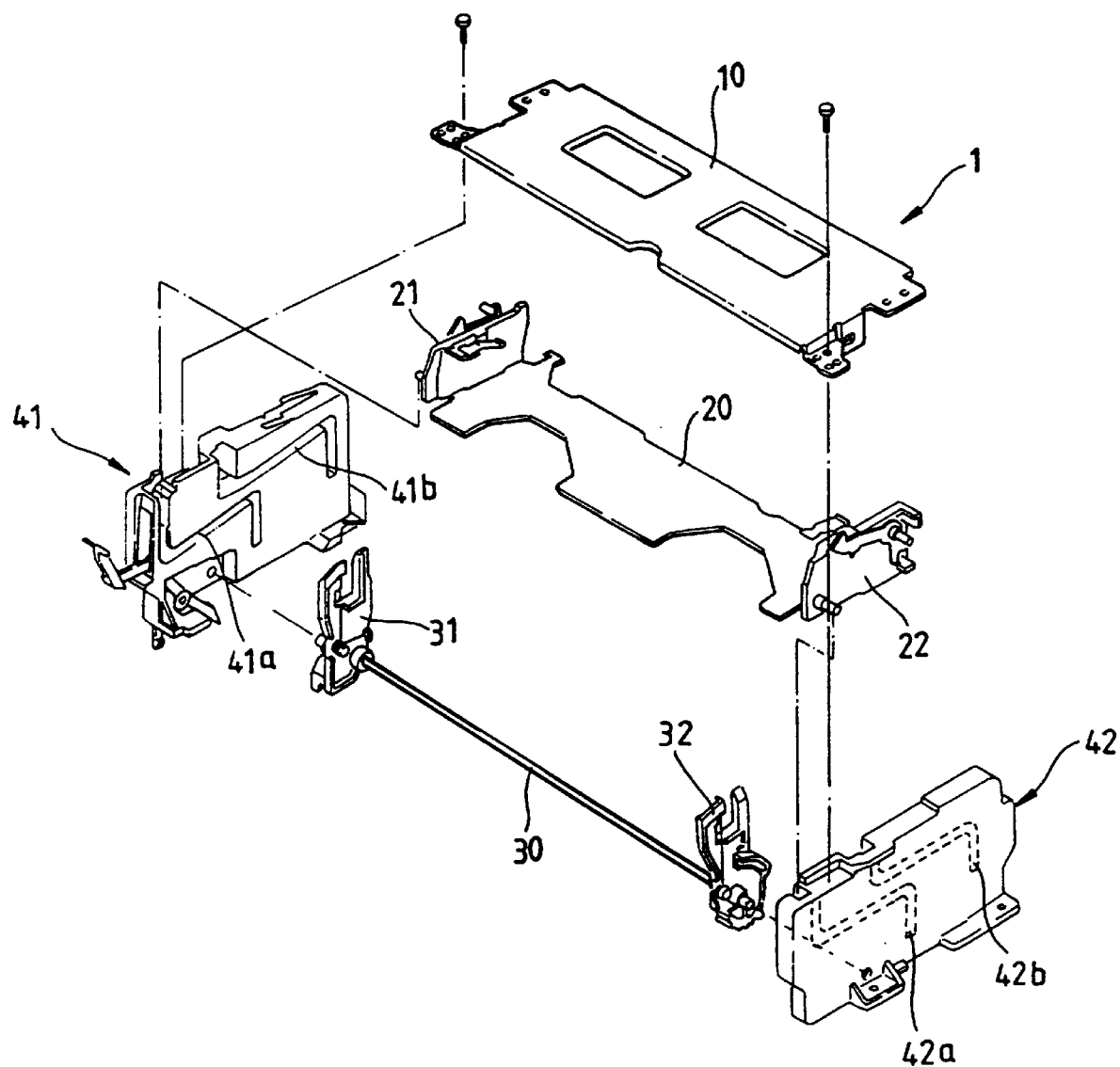
FIG. 1 is an exploded perspective view of a conventional cassette loading apparatus in a tape recorder.
Figure 2:
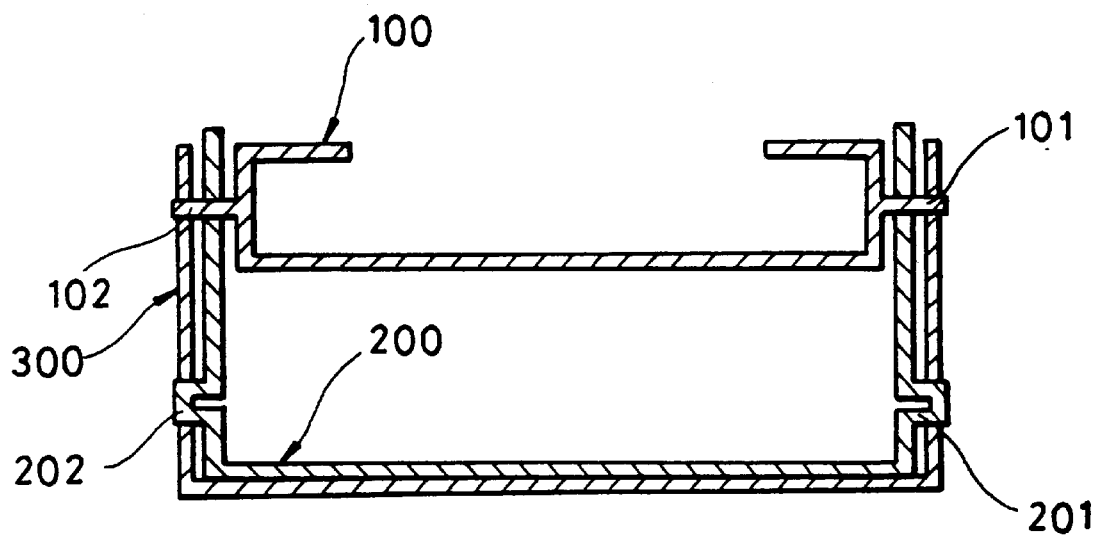
FIG. 2 is a sectional view of a cassette loading apparatus in a tape recorder according to the present invention.
Figure 3:
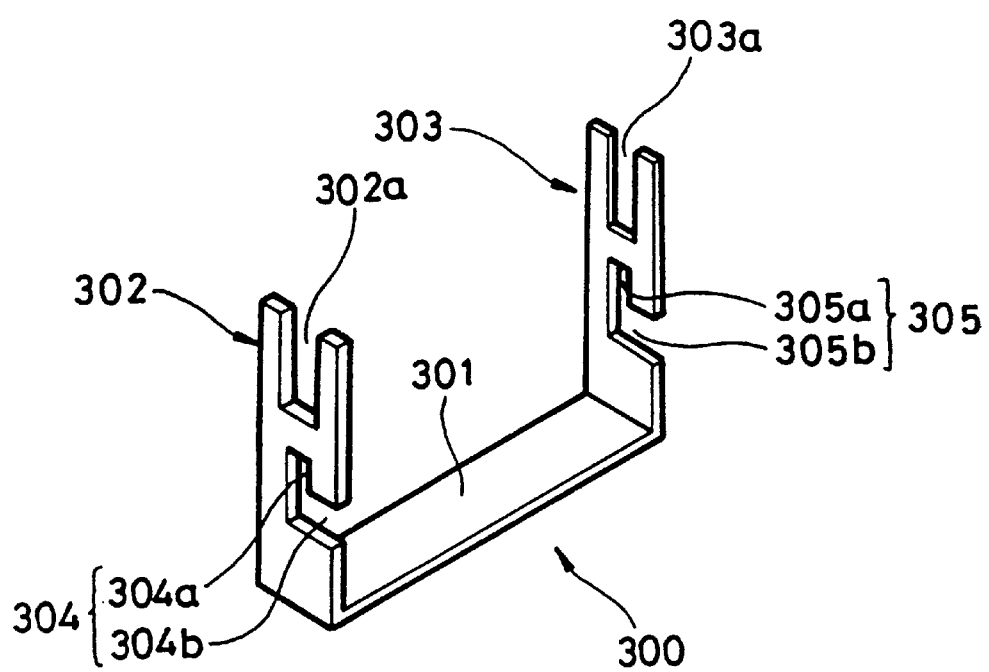
FIG. 3 is a perspective view of a loading shaft arm shown in FIG. 2.

Referring to FIG. 2, a cassette loading apparatus according to the present invention includes a cassette holder 100 having guide protrusions 101 and 102 on both sides thereof and a deck 200 having protrusions 201 and 202 on both sides thereof. The guide protrusions 101 and 102 of the cassette holder 100 are slidably combined with loading slits 210 (see FIG. 4A) formed in the opposite sides of the deck 200. Also, a loading shaft arm 300 is combined with the cassette holder 100 and the deck 200. As shown in FIG. 3, the loading shaft arm 300 is comprised of a pair of side arms 302 and 303 which combine with the guide protrusions 101 and 102 and the protrusions 201 and 202, and a beam 301 for connecting the side arms 302 and 303. The side arms 302 and 303 and the beam 301 are formed of a single body.

First slots 302a and 303a which slidably combine with the guide protrusions 101 and 102 of the cassette holder 100 and second slots 304 and 305 which slidably combine with the protrusions 201 and 202 of the deck 200 are formed in the side arms 302 and 303. The second slots 304 and 305 are provided with vertical slotted portions 304a and 305a formed in the same direction as that of the first slots 302a and 303a, respectively, and horizontal slotted portions 304b and 305b extending from the vertical slotted portions 304a and 305a at a right angle thereto, respectively. The loading shaft arm 300 can be easily manufactured by punching with a press and then folding portions corresponding to the side arms 302 and 303.

Figure 4A:
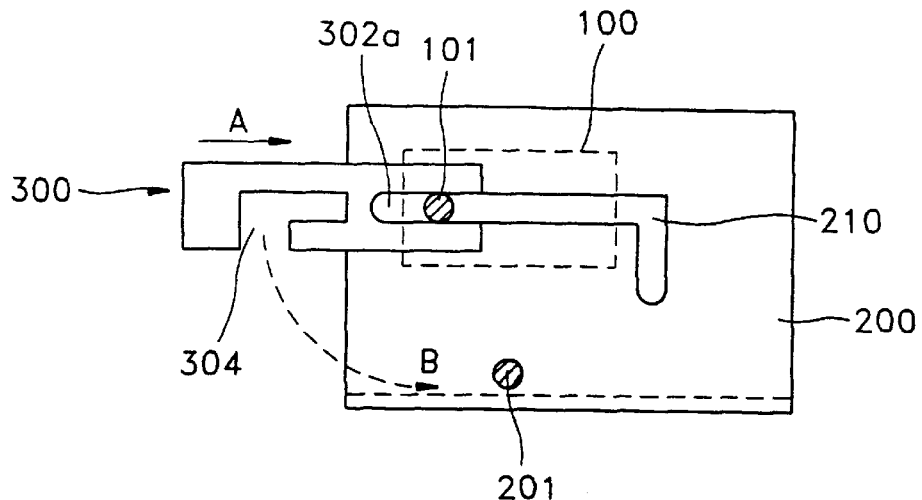
FIGS. 4A, 4B and 4C show a procedure for assembling the cassette loading apparatus according to the present invention.
Figure 4B:
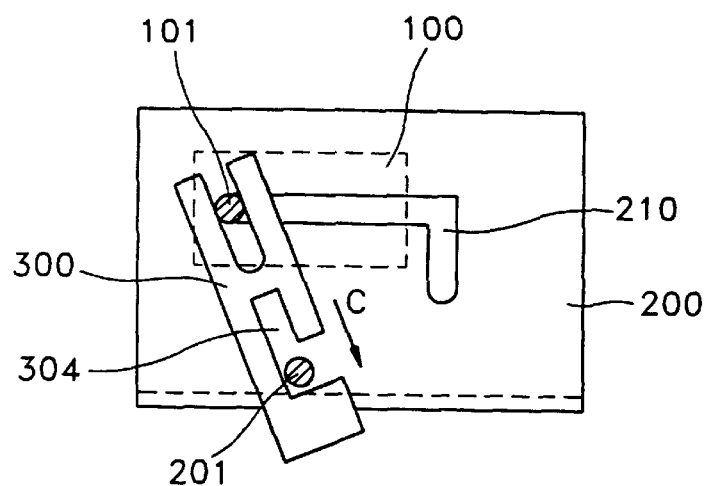
Figure 4C:
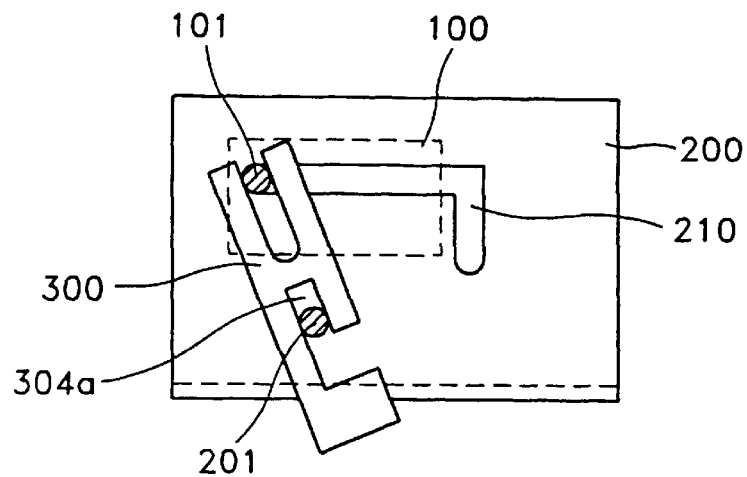

FIGS. 4A, 4B and 4C sequentially show the steps of assembling the loading shaft arm 300 to the cassette holder 100 and the deck 200. Only one side of the apparatus is shown for ease of description, but it should be understood that the assembly steps also apply to guide protrusion 102 and side arm 303 having first slot 303a and second slot 305, all of which are disposed on the other side of the apparatus. Referring to FIG. 4A, the loading shaft arm 300 is pushed in the direction indicated by an arrow A so that the guide protrusion 101 of the cassette holder 100, combined with the loading slit 210 of the deck 200, inserts through the first slot 302a of the side arm 302 of the loading shaft arm 300.

Next, the loading shaft arm 300 rotates in the direction indicated by an arrow B so that, as shown in FIG. 4B, the protrusion 201 formed in the deck 200 inserts through the horizontal slotted portion 304b (see FIG. 3) of the second slot 304 in the loading shaft arm 300.

Then, the loading shaft arm 300 slides in the direction indicated by an arrow C so that, as shown in FIG. 4C, the protrusion 201 combines with the vertical slotted portion 304a of the loading shaft arm 300.

The loading shaft arm 300 can therefore be combined with the cassette holder 100 and the deck 200 through the simple assembly steps. Also, in the cassette loading apparatus according to the present invention, the loading shaft arm 300 combines with the outer side of the U-shaped deck 200 whose plane portion and both side portions are formed of a single body so that its assembly is particularly easy.

Figure 5:
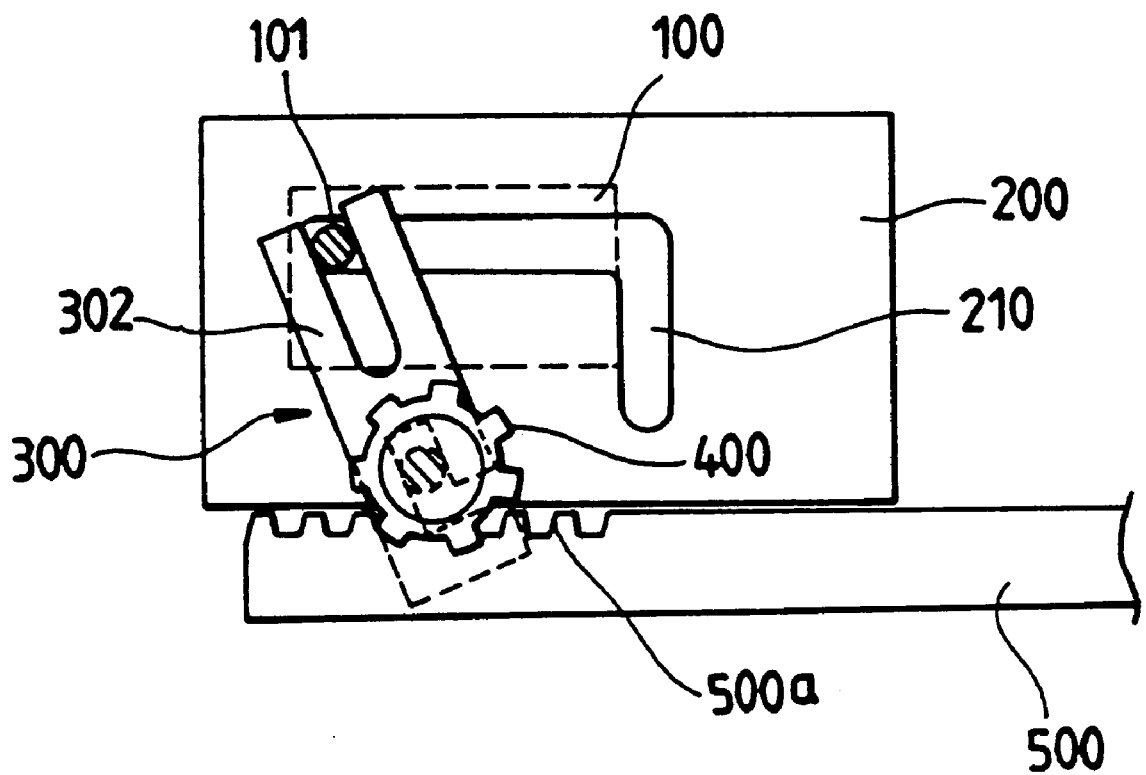
FIG. 5 is a view for illustrating the operation of the cassette loading apparatus in a tape recorder according to the present invention.

Meanwhile, as shown in FIG. 5, a gear 400 is combined with the side arm 302 of the loading shaft arm 300 and engages with a rack 500a formed on a slide member 500 which reciprocates by a loading motor (not shown). That is, as the slide member 500 is moved by the loading motor, the gear 400 interlocked with the rack 500a rotates and the side arm 302 of the loading shaft arm 300 thus rotates. The side arm 302 moves the guide protrusion 101 along the loading slit 210 so that the cassette holder 100 is moved and loads a received tape cassette (not shown).

When the aforementioned cassette loading apparatus according to the present invention and the method of assembling the same are employed, the assembly process is simplified due to a reduction in the entire number of components. Also, each assembly step is performed easily so that productivity can be enhanced.

It is contemplated that numerous modifications may be made to the apparatus and method of the present invention without departing from the spirit and scope of the invention as defined in the following claims.

What is claimed is:

1. A cassette loading apparatus in a tape recorder, comprising:

a deck including a pair of opposite side surfaces each of which has a loading slit and a protrusion;

a cassette holder on which a tape cassette is received and having a pair of side surfaces, each of said side surfaces having a guide protrusion which is slidably combined with a corresponding one of said loading slits;

a loading shaft arm including side arms each rotatably connected to a corresponding one of the opposite side surfaces of said deck and having a first slot with which said guide protrusion of said cassette holder is combined, and a second slot with which said protrusion of said deck is combined, and a beam for connecting said side arms, wherein each of said second slots is comprised of a vertical slotted portion formed in a common direction as that of said first slot and a horizontal slotted portion extending from said vertical slotted portion at a right angle thereto; and a driving mechanism for rotating said side arms.

2. The apparatus of claim 1, wherein said side arms and said beam are formed of a single body.

3. The apparatus of claim 1, wherein said driving mechanism comprises:

a gear combined with a side surface of at least one of said side arms; and a reciprocating slide member on which a rack, which is interlocked with said gear, is formed.

4. A method of assembling a cassette loading apparatus, said cassette loading apparatus including: a deck having a pair of opposite side surfaces each of which has a loading slit and a protrusion; a cassette holder having a pair of side surfaces, each of said surfaces having a guide protrusion which is slidably combined with a corresponding one of said loading slits; a loading shaft arm including side arms each rotatably connected to a corresponding one of the opposite side surfaces of said deck and having a first slot with which said guide protrusion of said cassette holder is to be combined, and a second slot with which said protrusion of said deck is to be combined and which includes vertical and horizontal slotted portions, and a beam for connecting said side arms, said method comprising the steps of:

a) sliding and inserting each of said guide protrusions through a corresponding one of said first slots formed on the side arms of said loading shaft arm;

b) inserting each of said protrusions of said deck through a corresponding one of said horizontal slotted portions of said second slots by rotating said loading shaft arm; and c) sliding each of said protrusions of said deck from said corresponding horizontal slotted portions to respective said vertical slotted portions by moving said loading shaft arm and combining each of said protrusions with the respective vertical slotted portions.

* * * * *